June 30, 1959 J. H. HOLMES 2,892,916
THERMISTOR PROBE HEAT CONTROL CIRCUIT
Filed Dec. 13, 1957
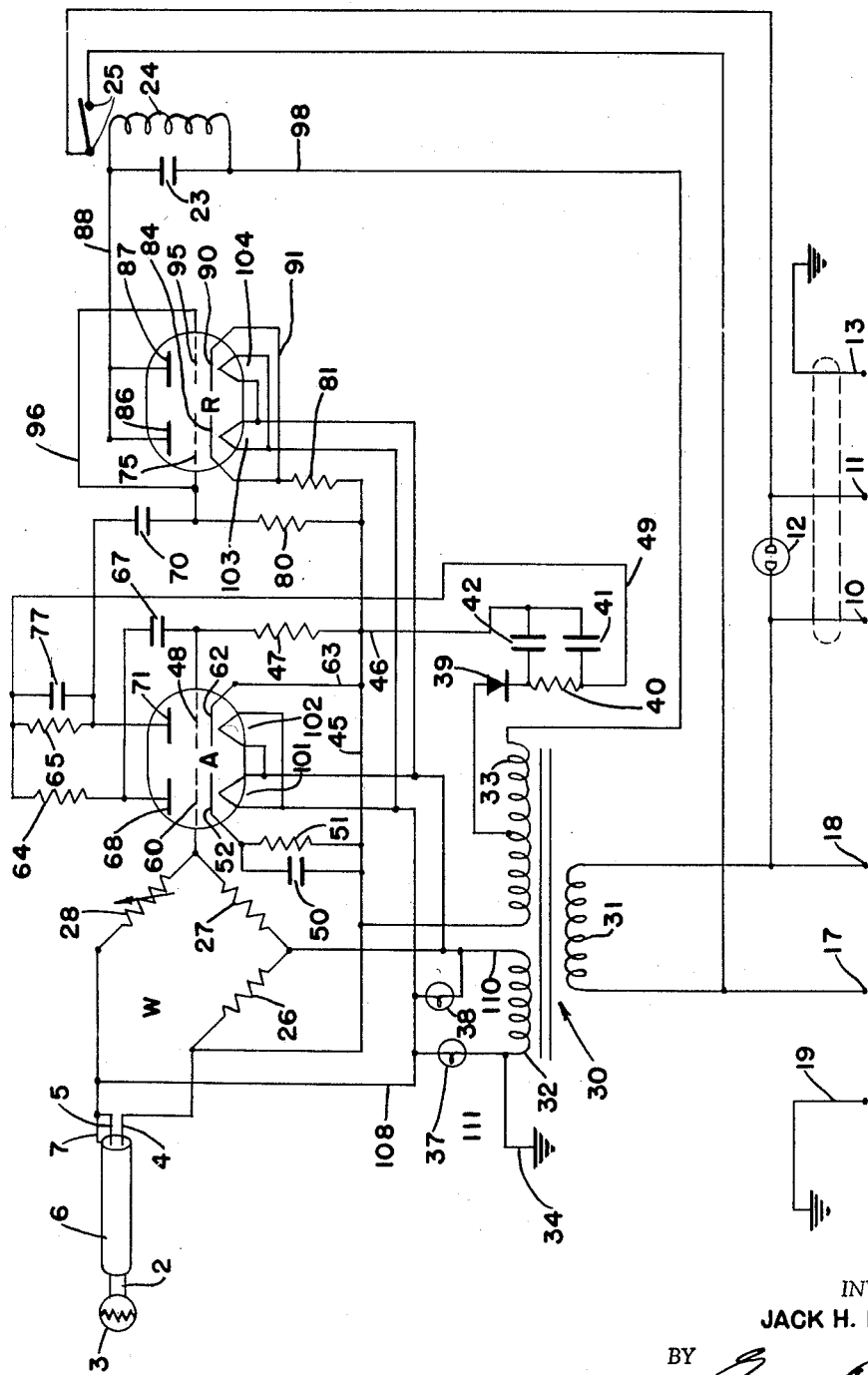
INVENTOR.
JACK H. HOLMES
BY
ATTORNEY

United States Patent Office 2,892,916
Patented June 30, 1959

2,892,916

THERMISTOR PROBE HEAT CONTROL CIRCUIT

Jack H. Holmes, Cleveland, Ohio, assignor to The James C. Heintz Company, Cleveland, Ohio, a corporation of Ohio Application December 13, 1957, Serial No. 702,557

2 Claims. (Cl. 219—20)

This invention relates to a thermistor probe heat control circuit to be used in controlling the temperature of an object, and more particularly it relates to the control of an electric heating element in such an object. The object is provided with a hole for the insertion of the probe which actuates the desired temperature control.

The control circuit is operated by alternating current. It includes an alternating current Wheatstone bridge, in which the thermistor constitutes one leg of this bridge. A variable resistance in an adjacent leg is used to control the temperature at which the thermistor is to operate.

When the thermistor is at the temperature selected by the variable resistance in the Wheatstone bridge no current flows through the circuit. When the temperature of the thermistor is below that selected so that its resistance is higher than at the selected temperature, current flows through the Wheatstone bridge. This current flows in phase with a phase-controlled rectifier. It is amplified and flows through the phase-controlled rectifier to a direct current relay which actuates the heating means in the object being heated.

The amplifier may be a two-stage amplifier or it may include three or four stages depending upon the exactness of the temperature differential permitted in the object between the times when heat is supplied to the object, and when no heat is supplied to the object.

The rectifier which operates the relay is phase controlled. When the Wheatstone bridge is in balance the phases are in balance and no current flows from the Wheatstone bridge. Consequently no current passes through the rectifier. Under such conditions the relay which operates the heating element or other heating or cooling means, stays open, allowing no current to pass to the heating element or other temperature control means. When the temperature at which the probe is heated is below the selected temperature current flows from the Wheatstone bridge through the amplifier to the rectifier in phase, and the rectifier passes current closing the relay. This causes current to flow through the temperature-control means.

The amplifier will be illustrated as of the vacuum tube type but it is to be understood that other amplifiers may be employed such as semi-conductors or transistors.

The invention will be further described in connection with the accompanying drawing. This drawing shows the circuit which will be described. It is to be understood that the probe may be of any usual design. The electrical units will ordinarily be enclosed in a box or case which is grounded. A power source is supplied to this control box and leads with a plug extend from the control box to the temperature-control means.

The probe terminates in a projection 2 of relatively small diameter. At the end of the projection is the thermistor 3. The probe is connected by wires 4 and 5 to the control box. These wires are of any required length. A shield 6 which encloses these wires acts as a ground through the wire 7 to isolate probe wires from stray current pick up.

The heating element is connected to the terminals 10 and 11. The neon pilot light 12 indicates when power is going to the heating element. The third terminal 13 is a part of the plug which includes the terminals 10 and 11. This terminal 13 carries a safety ground which serves to ground the thermistor and complete the electrical circuit to the filaments of the amplifier. Should the thermistor be accidentally left out of the heating element, the lack of ground return cuts off power to the heating element so that it will not function.

The service connection on the control box is shown in the left-hand lower corner of the drawing. It includes the terminals 17 and 18 and the ground 19 which grounds the control box.

The other units shown in the drawing are all necessarily located within the control box. They include generally the Wheatstone bridge, the amplifier A and the rectifier R. The probe operates through the Wheatstone bridge, the amplifier A, and the phase-controlled rectifier R to the relay shown in the upper right-hand corner. This relay includes the capacitor 23 and the relay coil 24 which opens and closes the contacts 25. On closing these contacts, current flows from the terminals 17 and 18 to the terminals 10 and 11 which are connected with the heating element.

There are four legs of the Wheatstone bridge. The thermistor forms one of these. The resistors 26 and 27 constitute the two set legs of the bridge. The variable resistor 28 forms the fourth leg of the bridge and is used to select the temperature.

The units within the control box are powered by the transformer 30. This includes the primary winding 31, the low-voltage secondary winding 32, and a tapped high voltage winding 33. The transformer is grounded to the box at 34. The Wheatstone bridge and the filaments of the component tubes are operated from the low-voltage winding 32.

For convenience a red bulb 37 is included between the low-voltage winding and the Wheatstone bridge which is lighted when the thermistor is mechanically and electrically out of the control circuit. The green bulb 38 is connected across the filament load and lights when all components are in operation; in other words, when the probe is in the heated object.

The amplifier A is powered by the rectifier 39 and the resistance capacitor network comprising the resistor 40 and the capacitors 41 and 42. These supply direct current to the amplifier. The internal common circuit 45 is connected to the negative side of the capacitors by the line 46. This line is connected through the resistor 47 to the second amplifier grid 48. The positive lead 49 is the power supply to the amplifier. The numerals 50 and 51 identify the bias resistors and condensers for the first stage of amplification which connect wire 45 to the cathode 52.

The two legs 27 and 28 of the bridge are connected to the grid 60 of the phase amplifier. The cathode 62 on the second stage of the amplifier is connected to wire 45 by the lead 63.

The plate load resistor of the first stage of amplification 64 and the plate load resistor of the second stage of amplification 65 are connected with the power lead 49. The coupling capacitor 67 connects the plate 68 of the first stage of amplification to the grid 48 of the second stage of amplification. The capacitor 70 connects the plate 71 of the second stage of amplification to the grid 75 of the phase-controlled rectifier R. The capacitor 77 which connects across the resistor 65 is for correcting wave form.

Resistor 80 connects the internal common circuit wire 45 to the grid 75 of the rectifier R. Resistor 81 connects line 45 to the cathode 84 of the rectifier.

The rectifier R is shown as a dual tube rectifier, with the tubes operating in parallel. A single tube might be employed.

The two plates 86 and 87 of the rectifier R are connected in parallel with the line 91. The second grid 95 is connected in parallel by the line 96 to grid 75.

Capacitor 23 and relay coil 24 are connected by wire 98 to the terminal of the high-voltage winding 33.

The filaments 101 and 102 of the two stages of the amplifier and the filaments 103 and 104 of the controlled rectifier are wired in parallel. One of the filament leads connects to the shield 6 of the thermistor through the wire 7 by means of wire 108. The other filament lead connects to low-voltage transformer winding 32.

Generally speaking, it will not be necessary to change the amplifier or the rectifier for the control of different temperatures in different types of equipment. The legs of the Wheatstone bridge will be changed for different temperature ranges. For the control of lower temperatures—for instance, 275° F. to 350° F.—the resistors 26 and 27 will have 6800 ohms and the variable resistor 28, 3000 ohms. At 275° F. a thermistor value of 100,000 ohms at 70° F. can be used satisfactorily. For higher temperatures the resistances of resistors 26, 27, 28 and the thermistor will have values corresponding to the temperature range employed.

Also different relays will be employed for different current ratings.

The following is illustrative of the equipment which may be used regardless of the temperature range of the heated element and the current utilized for heating. For two-stage amplification a tube known commercially as 12AU7 is satisfactory and the same tube may be used for the controlled rectifier R. For different stages of amplification comparable equipment will be employed. Other tubes may be used. The amount of current required for the relay coil determines the type of rectifier used. Instead of 12AU7 tubes, equivalent tubes may be employed as is known to the man skilled in the art. The tube specified embodies a 12-volt filament and includes seven major elements. For operation in the range of 275° to 350° F. with resistors as indicated in the Wheatstone bridge, the following equipment can be utilized satisfactorily, it being understood that equivalent equipment for a balanced operation can be utilized as understood by the man skilled in the art. Resistors 81, 51, 40, 65, 64, 47 and 80 may be resistors of 150, 390, 6800, 100,000, 100,000, 470,000 and 470,000 ohms respectively.

With the foregoing resistors, the capacitors having the indicated microfarad ratings operate satisfactorily in the temperature range indicated:

| | Mfd. |
|---|---|
| Capacitor 50 | 10 |
| Capacitor 77 | .01 |
| Capacitor 67 | .1 |
| Capacitor 70 | .1 |
| Capacitors 23, 41 and 42 | 20 |

Utilization the foregoing equipment, a relay having a direct current coil is satisfactory. That known commercially as QCX-10 Amrecon relay may be utilized.

The rectifier 39 may be a selenium rectifier. It may have a capacity of 65 milliamperes.

Transformer 30 is used to supply the alternating current to the control as well as to isolate the control from the power line.

With the foregoing equipment, and with the thermistor being used to control the temperature of a heating element at 300° F., for example, the operation is as follows: If the temperature of the heating element is at or above the selected temperature of 300° F., the grids of the controlled rectifier R swing negative with respect to the plates. This condition is brought about by the off-balance of the Wheatstone bridge with respect to phase, with a resulting stoppage of current flow through the phase-controlled rectifier R, de-energizing relay 24 and thereby stopping current flow to the heating element. When the thermistor is heated to the selected temperature or above, the tendency is for the current to flow through the amplifier to the phase-controlled rectifier grid, out of phase with the plate. As a result, no current flows.

When the thermistor is heated to a temperature below the selected temperature, current flows through the amplifier to the phase-controlled rectifier in an in-phase condition causing current to flow and energize the relay. This brings the contact points 25 together, completing the circuit to the heating element.

When the thermistor probe is not in contact with the heated surface, the amplifier and controlled rectifier are de-energized and red light 37 is lighted. This is due to the fact that the shield 6 is not grounded through the ground 13 allowing filament voltage to be by-passed through red light 37.

When the thermistor is in contact with a heated element the system is energized and the green light 38 is lighted indicating current flow directly to the filaments. When current is flowing to the filaments the red light is extinguished. When the connection with the ground is broken, the red light is on and the green light is extinguished. Thus in order for the control unit to operate it is necessary that the shield 6 be grounded through terminal 13 which is the equipment ground. This is the same ground as the ground 34.

Resistor 81 biases the phase-controlled rectifier below the operating range of the relay coil 24. Thus, should any component part of the amplifier fail, relay 24 will remain de-energized and fail safe.

Although the invention has been explained more particularly in connection with the operation of an electrical heating unit, it is to be understood that the relay may be utilized to operate other forms of heat control other than an electrical heating element, such as a steam valve, a gas valve, a refrigerating compressor or a motor, etc. It may control refrigeration as well as heating by interchanging the leads 110 and 111 from the low-voltage winding 32 of the transformer. Thus, the thermistor control may be utilized to control either a raising or lowering temperature.

The invention is covered in the claims which follow.

What I claim is:

1. A temperature-control unit for an object in which there is an electric-heater temperature control means, which control unit includes a thermistor, a Wheatstone bridge which includes a variable leg, an amplifier, a phase-controlled triode rectifier, a resistor in series with the cathode of the rectifier of sufficient resistance to bias the rectifier in the event of a failure of a component of the amplifier so as to make the control unit fail safe, and a relay adapted to connect the heater with a source of alternating electric current, the thermistor being adapted to be brought into heat-exchange relationship with said temperature control means and being one leg of the bridge adjacent to the variable leg whereby a change in the temperature of the thermistor which causes a change in its resistance creates an unbalanced condition in the bridge which not only causes a change in the voltage output of the bridge but also a change in the phase relationship of the input voltage to the amplifier; the bridge, the amplifier, the rectifier and the relay being connected in sequence, the output of the amplifier being fed to the grid of the rectifier and the relay being connected in series with the plate of the rectifier and said current source whereby the signal produced by the bridge and amplified by the amplifier is introduced to the grid of the rectifier in relationship to the phase of the plate circuit of the rectifier causing the relay to be actuated in relationship to the phase and amplitude of said signal.

2. A temperature-control unit for an object in which there is an electric-heater temperature control means, which control unit includes a thermistor, a Wheatstone bridge which includes a variable leg, an amplifier, a phase-controlled triode rectifier, and a relay adapted to connect the heater with a source of alternating electric current, the thermistor being adapted to be brought into heat-exchange relationship with said temperature control means and being one leg of the bridge adjacent to the variable leg whereby a change in the temperature of the thermistor which causes a change in its resistance creates an unbalanced condition in the bridge which not only causes a change in the voltage output of the bridge but also a change in the phase relationship of the input voltage to the amplifier; the bridge, the amplifier, the rectifier and the relay being connected in sequence, the output of the amplifier being fed to the grid of the rectifier and the relay being connected in series with the plate of the rectifier and said current source whereby the signal produced by the bridge and amplified by the amplifier is introduced to the grid of the rectifier in relationship to the phase of the plate circuit of the rectifier causing the relay to be actuated in relationship to the phase and amplitude of said signal, the circuit being grounded and said thermistor having thereon a shield in which the operating circuit is completed by contact of said shield with the ground on the unit.

References Cited in the file of this patent
UNITED STATES PATENTS

| | | |
|---|---|---|
| 2,657,580 | Schroeder | Nov. 3, 1953 |
| 2,664,489 | Dickey | Dec. 29, 1953 |
| 2,713,130 | Weiller | July 12, 1955 |
| 2,795,697 | Nagel | June 11, 1957 |
| 2,805,311 | Fluegel et al. | Sept. 3, 1957 |
| 2,826,072 | Kliever et al. | Mar. 11, 1958 |